July 4, 1933. T. H. SWISHER 1,916,746
APPARATUS FOR AND METHOD OF MAKING ICE CREAM OR THE LIKE
Filed May 10, 1928
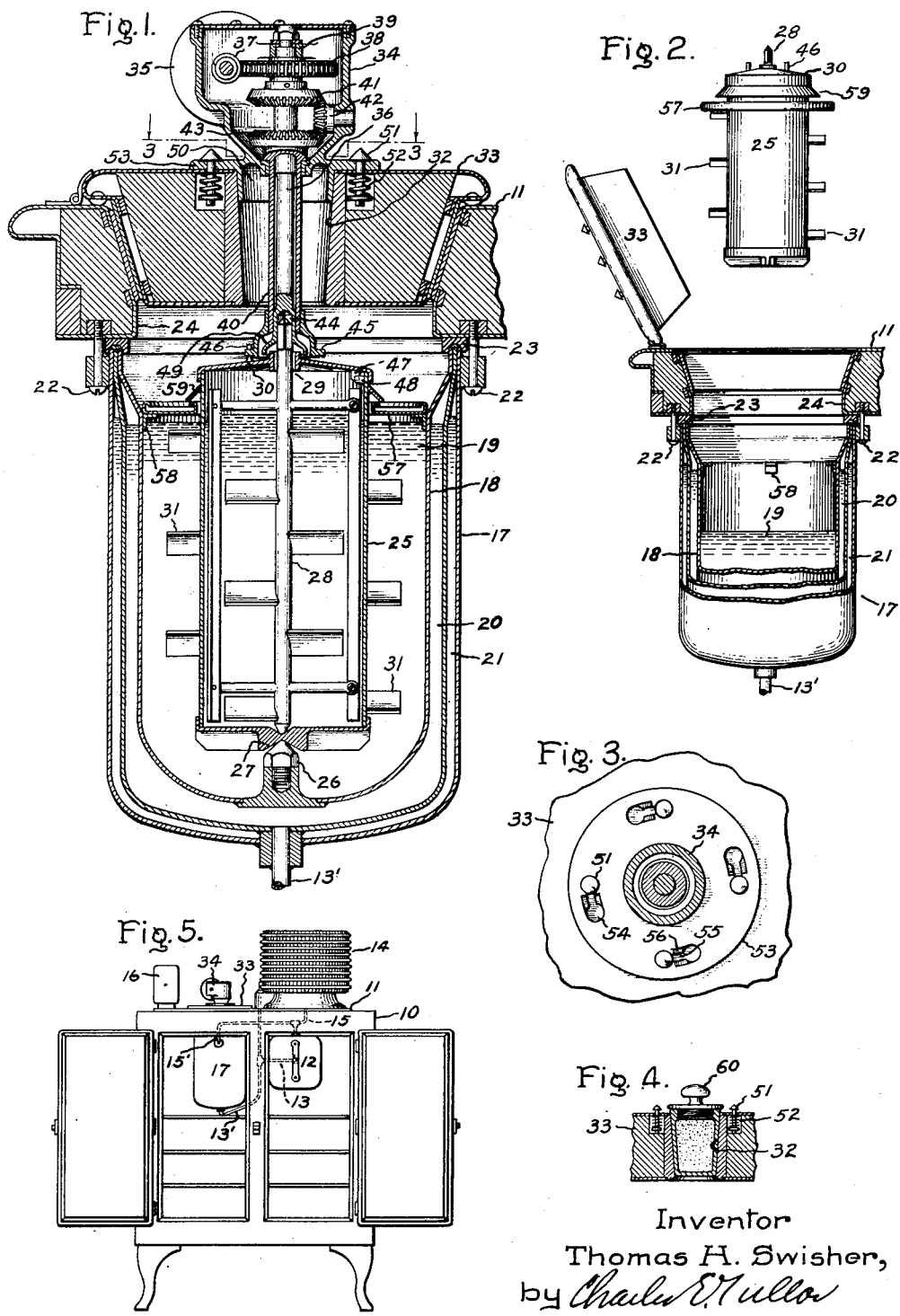
Inventor
Thomas H. Swisher,
by Charles E. Muller
His Attorney.

Patented July 4, 1933

1,916,746

UNITED STATES PATENT OFFICE

THOMAS H. SWISHER, OF SCHENECTADY, NEW YORK, ASSIGNOR TO GENERAL ELECTRIC COMPANY, A CORPORATION OF NEW YORK

APPARATUS FOR AND METHOD OF MAKING ICE CREAM OR THE LIKE

Application filed May 10, 1928. Serial No. 276,766.

My invention relates to an apparatus for and method of making ice cream or the like in a refrigerator of the type having a cabinet and a refrigerating system associated therewith for maintaining the desired temperature therein.

The temperature of the air as normally maintained in household refrigerators of this kind is that best suited for the preservation of food, which is below 50 degrees F. and above 32 degrees F., and this temperature is maintained by a refrigerating system having a cooling unit therein which is at a temperature considerably below freezing. The cabinets of these refrigerators are provided with good heat insulation so that the refrigerating capacity of the systems used therewith are quite small. For this reason, it has heretofore been impracticable to freeze ice cream or the like by utilizing the refrigerating system of such a refrigerator because the refrigerating capacity or rate of cooling required to freeze properly the amount of ice cream desired, usually about one or two quarts, has been greater than the refrigerating capacity of the system, and even if the refrigerating capacity of the system has been great enough for the purpose, the time required has been several hours which is unreasonably long.

The object of my invention is to provide an improved apparatus for and method of making ice cream in a comparatively short time by the use of the refrigerating system of a household refrigerator. The apparatus by which I accomplish this comprises a container arranged in heat exchange relation with the cooling unit of the refrigerator cabinet having a quantity of freezing solution therein sufficient to provide a negative heat storage capacity great enough to freeze the amount of ice cream desired, a vessel adapted to contain a mixture for making ice cream or the like which is arranged in the container so as to utilize the refrigerating effect of the freezing solution to freeze the mixture, and a device for agitating the mixture during freezing the same. The novel method which I employ in making ice cream or the like includes cooling a body of freezing solution in the refrigerator so as to provide a negative heat storage capacity for freezing the desired amount of mixture for making ice cream or the like, placing a vessel containing the mixture in heat exchange relation with the freezing solution so as to utilize the refrigerating effect of the freezing solution to freeze the mixture, and agitating the mixture during freezing the same. In this way I am enabled to freeze ice cream or the like in a comparatively short time by using the refrigerating system of a household refrigerator which is of small refrigerating capacity.

My invention will be more fully set forth in the following description, referring to the accompanying drawing and the features of novelty which characterize my invention will be pointed out with particularity in the claims annexed to and forming a part of this specification.

In the drawing, Fig. 1 is a vertical sectional view of a portion of a refrigerator embodying my invention; Fig. 2 is a view similar to Fig. 1 showing a door, affording access to the freezing solution container, swung open and the vessel for the mixture for making ice cream or the like removed from the refrigerator; Fig. 3 is a sectional view on the line 3—3 of Fig. 1; Fig. 4 is a sectional view of a portion of the door of the freezing solution container showing a closure plug which is used when the stirring device is removed therefrom, and Fig. 5 is a front elevation of a refrigerator embodying my invention.

Referring to the drawing, the refrigerator in connection with which I have illustrated my invention comprises a cabinet 10 having a refrigerating system associated therewith. The system may be of any suitable form, but the one which I have shown, for convenience in illustration, is of the form shown in Christian Steenstrup's application, Serial No. 166,212, filed Feb. 5, 1927, now matured into Pat. No. 1,736,635, Nov. 19, 1929, which is assigned to the assignee of the present application. This system, which is mounted on a removable heat insulated lid 11 supported in an opening in the top of the cabinet, comprises a cooling unit 12 suspended from the lid 11 inside of the cabinet to which liquid refrigerant is supplied by a pipe 13 from an air-cooled condenser 14 on top of the lid 11 and from which the vaporized refrigerant is returned by a pipe 15 to the compressor of the system. The system is controlled by a thermostatic switch indicated at 16 connected in the circuit of the compressor motor of the system and mounted on the lid 11.

The temperature is maintained in the refrigerator by periodic operation of the system under the control of the thermostatic switch 16 at between 40 and 50 degrees F., which is best adapted for the preservation of food, and the cooling unit 12 is normally maintained at a low enough temperature to readily make ice cubes therein. As the cabinet 10 is provided with good heat insulation, the refrigerating capacity of the system used therewith is comparatively small, and although it is great enough to freeze ice cubes or certain desserts that do not require stirring, it is not great enough to freeze a mixture for making ice cream or the like requiring stirring. This difficulty has been experienced because the heat of friction in stirring the amount of ice cream usually desired, about one or two quarts, is sufficient to prevent satisfactory freezing of the ice cream with the available refrigerating capacity of the system.

In accordance with my invention the small capacity refrigerating system, such as that ordinarily used in a household refrigerator, is used for freezing a mixture for making ice cream or the like by providing a negative heat storage capacity associated with the system which is cooled by operation of the system for considerable time, and which is large enough to absorb the quantity of heat required to lower the temperature of the mixture to the desired freezing temperature and also to absorb the heat of friction incident to stirring the same. By this arrangement the capacity for absorbing heat can be provided for making about one or two quarts of ice cream or the like in approximately ten minutes, even though the unaided capacity of the refrigerating system of the refrigerator is too small for the purpose.

In the particular construction illustrated, the negative heat storage capacity is provided by arranging in the cabinet 10 a cooling unit 17 in the form of an open-container 18 for a sufficient quantity of freezing solution, indicated at 19, to freeze the amount of ice cream or the like desired when the solution is cooled by the system of the refrigerator. The cooling unit is of similar construction to that disclosed in the application of Christian Steenstrup, Serial No. 148,266, filed Nov. 13, 1926, now matured into Patent No. 1,755,084, April 15, 1930, and assigned to the assignee of the present application. This cooling unit is formed with a closed evaporator chamber 20, to which refrigerant is supplied through the pipes 13 and 13' from an air cooled condenser 14, and from which the vaporized refrigerant is returned to the compressor through pipes 15 and 15'. The evaporator chamber surrounds the chamber 18, the wall of which forms a wall of the evaporator chamber so that the refrigerant is directly in contact with the wall of the container. This facilitates the transfer of heat from the freezing solution at 19 to the refrigerant in the evaporator. Another closed chamber 21, which surrounds the evaporator chamber 20, contains a freezing solution for preventing the temperature in the refrigerator cabinet being made undesirably low when the freezing solution 19 in the container 18 is being cooled preparatory to making ice cream. The freezing solution in the chamber 21 regulates the heat transfer from the inside of the cabinet 10 to effect the temperature therein in this manner because the solution in the chamber 21 freezes when the solution indicated at 19 is cooled preparatory to making ice cream so that the transfer of heat through the chamber 21 is then entirely by conduction which is less rapid than by convection, as when the solution 19 is in the liquid state. Moreover, the freezing solution in chamber 21 prevents the sudden variations in temperature within the cabinet from causing corresponding variations in the temperature in the cooling unit because of the negative heat storage capacity of the solution.

The freezing solution in the open container 18, which is coated with a vitreous enamel to resist corrosion, may be of any suitable substances having a low enough freezing point to give the negative heat storage capacity required to cool the mixture to the desired freezing temperature. I have found, however, that a solution in the proportion of 1000 cc. of water, 50 cc. of glycerin, and 100 grams of salt (sodium chloride) is best, as there is little or no tendency for hard ice to form on the wall of the container due to segregation between the ice and the salt water when ice begins to form in the container. This would be objectionable as the ice would form on the wall of the container and interfere with the transfer of heat from the solution to the evaporator surrounding the same, moreover, it is difficult to break up this hard ice into small bits required to freeze the ice cream efficiently. The quantity of freezing solution 19 required depends upon the temperature to which it can be cooled by the refrigerating system and the amount of ice cream or the like that is frozen. However, the quantity is preferably sufficient to freeze the ice cream and absorb the heat evolved in stirring the same without depending on any substantial refrigerating effect of the refrigerant of the system during the freezing operation. When the particular solution 19 which I have specified is cooled preparatory to making ice cream it forms a mushy ice which readily absorbs heat from the mixture in the vessel 25.

The solution in the closed chamber 21 is preferably about 20% glycerin and 80% water so that the walls of the chamber 21 which are not enameled will not be corroded to any great extent.

The cooling unit 17 is secured to the lid 11 by bolts 22 with the mouth of the container 18 engaging a rubber gasket 23 surrounding an opening 24 formed in the lid so that air cannot circulate between the inside of the cabinet and the container. This prevents leakage of air from the cabinet and excessive cooling of the air therein when the freezing solution is cooled preparatory to making ice cream.

The mixture for making ice cream or the like is placed in a vessel or can 25 which is arranged in heat exchange relation with the solution 19 previously cooled to a sufficiently low temperature by the operation of the refrigerating system to form a mushy ice which provides the necessary negative heat storage capacity to freeze the mixture and absorb the heat evolved in stirring the same. The vessel 25, which is preferably arranged in contact with the mushy ice to obtain efficient transfer of heat thereto, is pivotally supported at the lower end by a cone 26 secured to the wall of the container 18 and engaging a seat 27 formed in the bottom of the vessel. The mixture in the vessel is agitated or stirred during freezing the same by a dasher 28 therein which extends through an opening 29 in the vessel cover 30 into engagement with a device for rotating the same. The vessel is also rotated during freezing the mixture therein and is provided with impeller blades 31 attached to the bottom and the sides thereof for circulating the mushy ice about the vessel which insures a rapid transfer of heat from the vessel thereto.

It is preferred to rotate the dasher 28 in one direction and the vessel 25 in the opposite direction during freezing the mixture. I do this by a mechanism which is removably supported in an opening 32 of a door 33 having suitable heat insulation between the walls thereof and hinged to the lid 11 so as to provide for ready access to the open container 18. This mechanism comprises a housing 34 having an electric motor 35 mounted thereon which drives a shaft 36 by a worm 37 and wheel 38. The shaft 36 is supported in a bearing 39 attached to the housing and is rotatably fitted in a sleeve 40 which is driven from the shaft 36 in the opposite direction thereto by bevel gears 41, 42 and 43. The lower end of the shaft 36 is formed with a square recess 44 adapted to engage the square end of the dasher 28 extending through the cover of the vessel 25, and the lower end of the sleeve 40 is provided with projections 45 engaging lugs 46 on the cover 30 which turns the vessel 25 by the lugs 47 and 48 secured to the cover and the vessel respectively. In order to provide for readily placing this mechanism so as to form a driving connection with the vessel and the dasher when the mechanism is arranged in the opening 29 in the door, the lower end of the shaft 36 is formed with a bell shaped flange 49 which guides the end of the dasher into the recess 44 and the projection 45 into engagement with lugs 46. The bell shaped flange 49 and the sleeve 40 surround the opening 29 in the cover 30 so as to prevent oil that may leak from the housing 34 or dirt getting into the vessel 25 through the opening 29 during the freezing operation. The housing 34 is centered in the opening 29 by an annular flange 50 adapted to fit therein and is removably secured in the opening by headed bolts 51 having springs 52 for resiliently retaining them against a flange 53 formed on the housing. In order to connect the bolts 51 to the flange 53 openings 54 are formed in the flange which are large enough to receive the heads of these bolts and which have offset slots 55 adapted to slidably engage the shanks of the bolts. The offset slots are formed with inclined surfaces 56 so that when the flange 53 of the housing is placed in the opening 29 with the heads of the bolts 51 in the openings 54 that counterclockwise rotation of the housing as viewed in Fig. 3, will cause the bolts to be raised against the springs and the heads thereof to firmly engage the flange 53 when the housing is in the position shown in Fig. 3. After the mixture in the vessel 25 is frozen the housing can be readily removed from the door by turning it until the heads of the bolts 51 are aligned with the openings 54, and the door can then be swung back, as shown in Fig. 2, to permit removal of the dasher from the vessel or can 25.

When the housing 34 is removed, the upper end of the vessel 25 is supported in substantially upright position by an annular pan 57 removably supported above the level of the freezing solution 19 on brackets 58 attached to the wall of the container 18 and loosely fitting the vessel. Upon closing the door 33 and placing the housing 34 for the driving mechanism in the opening 29, the vessel can be turned freely without rubbing against the pan. In order to prevent ice cream mixture overflowing from the vessel 25 during the freezing operation into the freezing solution 19 or being spilled into the same when the ice cream is removed from the vessel in the container 18, which would necessitate cleaning out the vessel 18, an outwardly flaring flange or skirt 59 is attached to the upper end of the vessel 25 below the cover 30 and extending over the pan 57.

It is to be observed that making ice cream by utilizing the refrigerating system of a refrigerator as above described, a novel method is involved which consists in cooling a body of freezing solution 19 in the refrigerator sufficiently to give the negative heat storage capacity required to reduce the temperature of the mixture for making ice cream or the like to the proper freezing temperature and to absorb the heat evolved at the same time in stirring the mixture. The particular solution which I use in the container 18 is cooled to a temperature of about 5 degrees F. so as to form a mushy ice which readily absorbs heat from the mixture in the vessel. The vessel 25 with the mixture therein for making ice cream or the like is placed in the container 18, as shown in Fig. 1, the door 33 is closed, and the stirring device is arranged in place so as to form a driving connection with the dasher 28 and the vessel. The motor 35 then drives the vessel and the dasher during the freezing of the mixture and the negative heat storage capacity of the solution 19 is utilized to freeze the mixture. Rotation of the vessel causes the impeller blades 31 to circulate the mushy ice about the vessel and facilitates freezing the mixture therein. After the mixture is frozen the motor 35 and housing 34 are removed, the door 33 is swung back, and the dasher 28 taken out of the vessel. The door is closed and a plug 60 is placed in the opening 32, as shown in Fig. 4, and the ice cream in the vessel is then allowed to cure in the usual manner.

Although my invention has been shown in connection with a compression refrigerating system of a domestic refrigerator, I do not desire my improved apparatus or method to be limited to use with any particular form of refrigerator or to be limited to the particular apparatus or method set forth except as such limitations are defined in the appended claims.

What I claim as new and desire to secure by Letters Patent of the United States is:

1. In combination with a refrigerator cabinet, a cooling unit therein in the form of a container for a freezing solution having a refrigerating system associated therewith, said cooling unit including a closed evaporator chamber surrounding said container and communicating with said system, a vessel adapted to contain a mixture for making ice cream or the like, means for supporting said vessel in said container and in direct contact with the freezing solution therein so as to utilize the refrigerating effect of the freezing solution to freeze the mixture in said vessel, and means for agitating the mixture during freezing the same.

2. In combination with a refrigerator cabinet, a cooling unit therein in the form of a container for a freezing solution having a refrigerating system associated therewith, said cooling unit including a closed evaporator chamber surrounding said container and communicating with said system, a closed chamber for a freezing solution surrounding said evaporator chamber, a vessel adapted to contain a mixture for making ice cream or the like, means for supporting said vessel in said container and in direct contact with the solution therein so as to utilize the refrigerating effect of the freezing solution to freeze the mixture in said vessel, means carried by said vessel for agitating said freezing solution, and means for agitating the mixture during freezing the same.

3. In combination with a refrigerator cabinet having an opening in a wall thereof, an open container in said cabinet having a freezing solution therein, the mouth of said container being retained against the inside of the wall of said cabinet about the opening therein, a vessel adapted to contain a mixture for making ice cream or the like, means for supporting said vessel in said container so as to utilize the refrigerating effect of the freezing solution to freeze the mixture in said vessel, and means for agitating the mixture during freezing the same.

4. In combination with a refrigerator cabinet having an opening in a wall thereof, a cooling unit in said cabinet in the form of an open container having a freezing solution therein, the mouth of said container being retained against the inside of the wall of said cabinet about the opening therein, a vessel adapted to contain a mixture for making ice cream or the like, means for supporting said vessel in said container so as to utilize the refrigerating effect of the freezing solution to freeze the mixture in said vessel, and means for agitating the mixture during freezing the same.

5. In combination with a refrigerator cabinet having an opening in a wall thereof, a cooling unit in said cabinet in the form of an open container for a freezing solution having a refrigerating system associated therewith, said cooling unit including a closed evaporator chamber surrounding said container and communicating with said system, the mouth of said container being retained against the inside of the wall of said cabinet about the opening therein, a vessel adapted to contain a mixture for making ice cream or the like, means for supporting said vessel in said container so as to utilize the refrigerating effect of the freezing solution to freeze the mixture in said vessel, and means for agitating the mixture during freezing the same.

6. In combination with a refrigerator cabinet having an opening in a wall thereof, a cooling unit in said cabinet in the form of an open container for a freezing solution having a refrigerating system associated therewith, the mouth of said container being retained against the inside of the wall of said cabinet about the opening therein, said cooling unit including a closed evaporator chamber surrounding said container and communicating with said system, a closed chamber for a freezing solution surrounding said evaporator chamber, a vessel adapted to contain a mixture for making ice cream or the like, means for supporting said vessel in said container so as to utilize the refrigerating effect of the freezing solution to freeze the mixture in said vessel, and means for agitating the mixture during freezing the same.

7. In combination with a refrigerator cabinet having an opening in a wall thereof and a door removably supported in the opening, an open container for a freezing solution in said cabinet having the mouth thereof adjacent the opening in the wall of said cabinet, a vessel adapted to contain a mixture for making ice cream or the like and arranged in said container, said container having sufficient freezing solution therein to freeze the mixture in said vessel, and means removably supported on said door for stirring said mixture during freezing the same.

8. In combination with a refrigerator cabinet having an opening in a wall thereof and a door removably supported in the opening, an open container for a freezing solution in said cabinet having the mouth thereof adjacent the opening in the wall of said cabinet, a vessel adapted to contain a mixture for making ice cream or the like and arranged in said container, said container having sufficient freezing solution therein to freeze the mixture in said vessel, said door having an opening therein, and means removably supported in the opening in said door for stirring said mixture during freezing the same.

9. In combination with a refrigerator cabinet having an opening in a wall thereof and a door removably supported in the opening, an open container for a freezing solution in said cabinet having the mouth thereof adjacent the opening in the wall of said cabinet, a vessel adapted to contain a mixture for making ice cream or the like and having a dasher therein, said vessel being arranged in said container, said container having sufficient freezing solution therein to freeze the mixture in said vessel, said door having an opening therein, and means removably supported in said opening for turning said vessel in one direction and for turning said dasher in the reverse direction so as to stir said mixture during freezing the same.

10. In combination with a refrigerator cabinet having an opening in a wall thereof and a door removably supported in the opening, an open container for a freezing solution in said cabinet having the mouth thereof adjacent the opening in the wall of said cabinet, a vessel adapted to contain a mixture for making ice cream or the like and having a dasher therein, said vessel being arranged in said container, said container having sufficient freezing solution therein to freeze the mixture in said vessel, said door having an opening therein, and means including an electric motor removably supported in said opening for turning said vessel in one direction and for turning said vessel in the other direction so as to stir said mixture during freezing the same.

11. In combination with a refrigerator cabinet having an opening in a wall thereof and a door removably supported in the opening, an open container for a freezing solution in said cabinet having the mouth thereof adjacent the opening in the wall of said cabinet, a vessel adapted to contain a mixture for making ice cream or the like, said vessel being arranged in the freezing solution in said container, said container having sufficient freezing solution therein to freeze the mixture in said vessel, and means for circulating said freezing solution about the vessel during freezing the mixture therein.

12. In combination with a refrigerator cabinet having an opening in a wall thereof and a door removably supported in the opening, an open container for a freezing solution in said cabinet having the mouth thereof adjacent the opening in the wall of said cabinet, a vessel adapted to contain a mixture for making ice cream or the like, said vessel being arranged in the freezing solution in said container, and an impeller attached to the bottom of said vessel for circulating the freezing solution about said vessel during freezing the mixture therein.

13. In combination with a refrigerator cabinet having an opening in a wall thereof and a door removably supported in the opening, an open container for a freezing solution in said cabinet having the mouth thereof adjacent the opening in the wall of said cabinet, a vessel adapted to contain a mixture for making ice cream or the like, said vessel being arranged in the freezing solution in said container, means carried by said door for rotating said vessel during freezing the mixture therein, and an impeller attached to said vessel for circulating the freezing solution in said open container about said vessel.

14. In combination with a refrigerator cabinet having an opening in a wall thereof and a door removably supported in the opening, an open container for a freezing solution in said cabinet having the mouth thereof adjacent the opening in the wall of said cabinet, a vessel adapted to contain a mixture for making ice cream or the like and having a flange carried thereby, said vessel being arranged in the freezing solution in said container, and an annular pan surrounding said vessel below said flange and above the level of the freezing solution for receiving any overflow of the mixture from said vessel and for preventing spilling ice cream into the solution.

15. In combination with a refrigerator cabinet having an opening in a wall thereof and a door removably supported in the opening, an open container for a freezing solution in said cabinet having the mouth thereof adjacent the opening in the wall of said cabinet, a vessel adapted to contain a mixture for making ice cream or the like, and having a flange thereon flaring outwardly, said vessel being immersed in the freezing solution in said container, and an annular pan surrounding said vessel below said flange and above the level of the freezing solution for receiving any overflow of the mixture from said vessel and for preventing spilling ice cream into the solution.

16. In combination with a refrigerator cabinet having an opening in a wall thereof, a door arranged in the opening in said wall and hinged thereto so that said door can be swung out of the opening, an open container for a freezing solution in said cabinet having the mouth thereof adjacent the opening in the wall of said cabinet, a vessel adapted to contain a mixture for making ice cream or the like, means at the lower end of said vessel for pivotally supporting the same in the freezing solution in said container, means carried by said door and separably connected to said vessel for rotating the latter during freezing the mixture therein, and means for aligning the upper end of said vessel with said means carried by said door for driving the same so that the last mentioned means can be readily connected to the vessel when said door is swung into the opening in said wall.

17. In combination with a refrigerator cabinet having an opening in a wall thereof, a door arranged in the opening in said wall and hinged thereto so that said door can be swung out of the opening, an open container for a freezing solution in said cabinet having the mouth thereof adjacent the opening in the wall of said cabinet, a vessel adapted to contain a mixture for making ice cream or the like and having a flange thereon, means at the lower end of said vessel for pivotally supporting the same in the freezing solution in said container, means carried by said door and separably connected to said vessel for rotating the latter during freezing the mixture therein, and an annular pan supported in said container and surrounding said vessel for aligning the upper end of said vessel with said means carried by said door for driving the same so that the last mentioned means can be readily connected to said vessel when said door is swung into the opening in said wall, said pan being arranged below said flange so as to receive any overflow from said vessel and for preventing spilling ice cream into the solution.

18. The method of making ice cream or the like in a refrigerator having a refrigerating system for cooling the same comprising, cooling a body of freezing solution in the refrigerator sufficiently to give the negative heat storage capacity required to freeze a quantity of ice cream or the like independently of the refrigerating system, placing a vessel containing a mixture for making ice cream or the like in heat exchange relation with the freezing solution so as to utilize the refrigerating effect of the freezing solution to freeze the mixture, and agitating the mixture during freezing the same.

19. The method of making ice cream or the like in a refrigerator having a refrigerating system for cooling the same comprising, cooling a body of freezing solution, consisting of component parts in substantially the proportion of 1000 cc. of water, 100 grams of sodium chloride, and 50 cc. of glycerin, to form an amount of mushy ice required to freeze ice cream; placing a vessel containing a mixture for making ice cream or the like in the mushy ice within the refrigerator so as to utilize the refrigerating effect of the same to freeze the mixture, and stirring the mixture during freezing the same.

20. The method of making ice cream or the like in a refrigerator having a refrigerating system for cooling the same comprising, cooling a body of freezing solution, within the refrigerator consisting of component parts in substantially the proportion of 1000 cc. of water, 100 grams of sodium chloride, and 50 cc. of glycerin, to form an amount of mushy ice required to freeze the ice cream; placing a vessel containing a mixture for making ice cream or the like in the mushy ice within the refrigerator so as to utilize the refrigerating effect of the same to freeze the mixture, circulating the mushy ice about the vessel to facilitate freezing the mixture therein, and stirring the mixture during freezing the same.

In witness whereof I have hereunto set my hand this 8th day of May, 1928.

THOMAS H. SWISHER.